(12) United States Patent
Kamath et al.

(10) Patent No.: US 12,229,113 B2
(45) Date of Patent: Feb. 18, 2025

(54) MANAGING MASTER DATA FOR DISTRIBUTED ENVIRONMENTS

(71) Applicant: SAP SE, Walldorf (DE)

(72) Inventors: Karthik Kamath, Bengaluru (IN);
Satish Kumar Kara, Bengaluru (IN);
Nagendra Manchuri, Bengaluru (IN);
Tripati Sahu, Bengaluru (IN);
Parmesh Kumar, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/743,347

(22) Filed: May 12, 2022

(65) Prior Publication Data
US 2023/0367761 A1   Nov. 16, 2023

(51) Int. Cl.
G06F 16/23      (2019.01)

(52) U.S. Cl.
CPC .............................. G06F 16/2365 (2019.01)

(58) Field of Classification Search
CPC ................................................. G06F 16/2365
See application file for complete search history.

(56) References Cited

U.S. PATENT DOCUMENTS

| | | | | |
|---|---|---|---|---|
| 7,680,935 B2 * | 3/2010 | Szypersky | ................ | G06F 9/54 |
| | | | | 717/136 |
| 8,713,434 B2 * | 4/2014 | Ford | ..................... | G06F 16/288 |
| | | | | 707/758 |
| 8,762,411 B2 * | 6/2014 | Poon | ...................... | G06F 16/23 |
| | | | | 707/769 |
| 9,235,607 B1 * | 1/2016 | Ross | ..................... | G06F 16/215 |
| 10,885,452 B1 * | 1/2021 | Garg | ........................ | G06N 7/01 |
| 11,514,012 B2 * | 11/2022 | Bouton | ............... | G06F 16/2228 |
| 2004/0034668 A1 * | 2/2004 | Gotz | ...................... | G06F 16/289 |
| 2010/0070797 A1 * | 3/2010 | Kaisermayr | ........ | G06F 11/0793 |
| | | | | 714/E11.023 |
| 2010/0114841 A1 * | 5/2010 | Holenstein | ............ | G06F 16/217 |
| | | | | 707/694 |
| 2010/0257149 A1 * | 10/2010 | Cognigni | ................ | G06F 16/27 |
| | | | | 711/216 |

(Continued)

FOREIGN PATENT DOCUMENTS

WO    WO-2012130489 A1 *   10/2012   ....... G06F 17/30371

OTHER PUBLICATIONS

Li et al. CN 111259027 A "A Data Consistency Detection Method"; Jun. 9, 2020 (Year: 2020).*

*Primary Examiner* — Dennis Truong
(74) *Attorney, Agent, or Firm* — Fountainhead Law Group, PC

(57) ABSTRACT

Some embodiments provide a non-transitory machine-readable medium that stores a program executable by at least one processing unit of a device. The program retrieves a plurality of sets of master data from a plurality of master data sources. Each set of master data in the plurality of sets of master data includes a set of entities. For each entity in each set of entities, the program further determines whether the entity is consistent or inconsistent. The program also receives, from an application, a request for a set of entities. The program further determines a subset of the set of entities, each entity in the subset of the set of entities determined to be consistent. The program also provides the subset of the set of entities to the application.

18 Claims, 12 Drawing Sheets

(56) References Cited

U.S. PATENT DOCUMENTS

| | | | |
|---|---|---|---|
| 2012/0089631 A1* | 4/2012 | Poon | G06F 16/904 |
| | | | 707/769 |
| 2014/0032594 A1* | 1/2014 | Bayliss | G06F 16/951 |
| | | | 707/769 |
| 2016/0140197 A1* | 5/2016 | Gast | G06F 8/60 |
| | | | 707/626 |
| 2018/0032434 A1* | 2/2018 | Patel | G06F 11/2094 |
| 2018/0137161 A1* | 5/2018 | Schwan | G06F 16/215 |
| 2018/0293586 A1* | 10/2018 | Doan | G06Q 30/01 |
| 2019/0102418 A1* | 4/2019 | Vasudevan | G06F 16/2365 |
| 2020/0301931 A1* | 9/2020 | Lai | G06F 16/24578 |
| 2021/0256525 A1* | 8/2021 | Hayes | G06Q 20/202 |

\* cited by examiner

MANAGING MASTER DATA FOR DISTRIBUTED ENVIRONMENTS

BACKGROUND

Many corporations use master data when conducting business electronically. In some instances, master data may represent data about business entities that provide context for business transactions. Common categories of master data include parties to transactions (e.g., individuals and organizations and well as their roles, such as customers, suppliers, employees, etc.), products, financial structures (e.g., ledgers, cost centers, etc.), locational concepts, etc. In some cases, master data may be managed and stored in a centralized computing system. In other cases, different master data can be managed by different computing systems in a distributed manner.

SUMMARY

In some embodiments, a non-transitory machine-readable medium stores a program executable by at least one processing unit of a device. The program retrieves a plurality of sets of master data from a plurality of master data sources. Each set of master data in the plurality of sets of master data includes a set of entities. For each entity in each set of entities, the program further determines whether the entity is consistent or inconsistent. The program also receives, from an application, a request for a set of entities. The program further determines a subset of the set of entities, each entity in the subset of the set of entities determined to be consistent. The program also provides the subset of the set of entities to the application.

In some embodiments, retrieving the plurality of sets of master data from the plurality of master data sources may include retrieving dependent entities first. Retrieving dependent entities first may include determining a first set of entities; determining a second set of entities, wherein each entity in the second set of entities is dependent on an entity in the first set of entities; retrieving the second set of entities; and after retrieving the second set of entities, retrieving the first set of entities.

In some embodiments, the program may further, for each entity in each set of entities determined to be inconsistent, mark the entity as being inconsistent. The program may further identify any entities previously marked as inconsistent and determine whether such entities are now consistent based on the plurality of sets of master data. Retrieving the plurality of sets of master data may include sending each master data source in the plurality of master data sources a request for master data and a time value indicating a time of a previous request. Each master data source in the plurality of master data sources may be configured to manage a particular set of master data entities.

In some embodiments, a method retrieves a plurality of sets of master data from a plurality of master data sources. Each set of master data in the plurality of sets of master data includes a set of entities. For each entity in each set of entities, the method further determines whether the entity is consistent or inconsistent. The method also receives, from an application, a request for a set of entities. The method further determines a subset of the set of entities, each entity in the subset of the set of entities determined to be consistent. The method also provides the subset of the set of entities to the application.

In some embodiments, retrieving the plurality of sets of master data from the plurality of master data sources may include retrieving dependent entities first. Retrieving dependent entities first may include determining a first set of entities; determining a second set of entities, wherein each entity in the second set of entities is dependent on an entity in the first set of entities; retrieving the second set of entities; after retrieving the second set of entities, retrieving the first set of entities.

In some embodiments, the method may further, for each entity in each set of entities determined to be inconsistent, mark the entity as being inconsistent. The method may further identify any entities previously marked as inconsistent and determine whether such entities are now consistent based on the plurality of sets of master data. Retrieving the plurality of sets of master data may include sending each master data source in the plurality of master data sources a request for master data and a time value indicating a time of a previous request. Each master data source in the plurality of master data sources may be configured to manage a particular set of master data entities.

In some embodiments, a system includes a set of processing units and a non-transitory machine-readable medium that stores instructions. The instructions cause at least one processing unit to retrieve a plurality of sets of master data from a plurality of master data sources. Each set of master data in the plurality of sets of master data comprising a set of entities. The instructions further cause the at least one processing unit to for each entity in each set of entities, determine whether the entity is consistent or inconsistent. The instructions also cause the at least one processing unit to receive, from an application, a request for a set of entities. The instructions further cause the at least one processing unit to determine a subset of the set of entities, each entity in the subset of the set of entities determined to be consistent. The instructions further cause the at least one processing unit to provide the subset of the set of entities to the application.

In some embodiments, retrieving the plurality of sets of master data from the plurality of master data sources may include retrieving dependent entities first. Retrieving dependent entities first may include determining a first set of entities; determining a second set of entities, wherein each entity in the second set of entities is dependent on an entity in the first set of entities; retrieving the second set of entities; and after retrieving the second set of entities, retrieving the first set of entities. The instructions may further cause the at least one processing unit to, for each entity in each set of entities determined to be inconsistent, mark the entity as being inconsistent. The instructions may further cause the at least one processing unit to identify any entities previously marked as inconsistent and determine whether such entities are now consistent based on the plurality of sets of master data. Retrieving the plurality of sets of master data may include sending each master data source in the plurality of master data sources a request for master data and a time value indicating a time of a previous request.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for managing master data for distributed environments. In some embodiments, several master data sources and several applications may be communicatively coupled to a data management system. Each of the master data sources manage and store its own set of master data. Each of the applications can sends the data management system requests for master data. Periodically, the data management system queries each of the master data sources for new master data and/or updates to existing master data. Upon receiving master data from one of the master data sources, the data management system stores the master data. Next, the data management system checks for any inconsistent entities (e.g., entities missing a parent/ancestor entity) in the master data received from the several master data sources. The data management system marks such entities as inconsistent entities. Then, the data management system checks whether any entities previously marked as inconsistent are now consistent based on the recently received master data. When the data management system receives a request for a particular set of master data from an application, the data management system determines the entities in the requested set of master data that are consistent (e.g., not marked inconsistent) and sends only those consistent entities to the application.

In some embodiments, master data is used to represent entities associated with the operation of a corporation. Examples of such entities may include buyer entities, supplier entities, customer entities, patient entities, product entities, asset entities, equipment entities, location entities (e.g., store entities, warehouse entities, factory entities, etc.), account entities, etc. In some embodiments, master data is non-transactional data that provides context for transactions.

Figure 1:
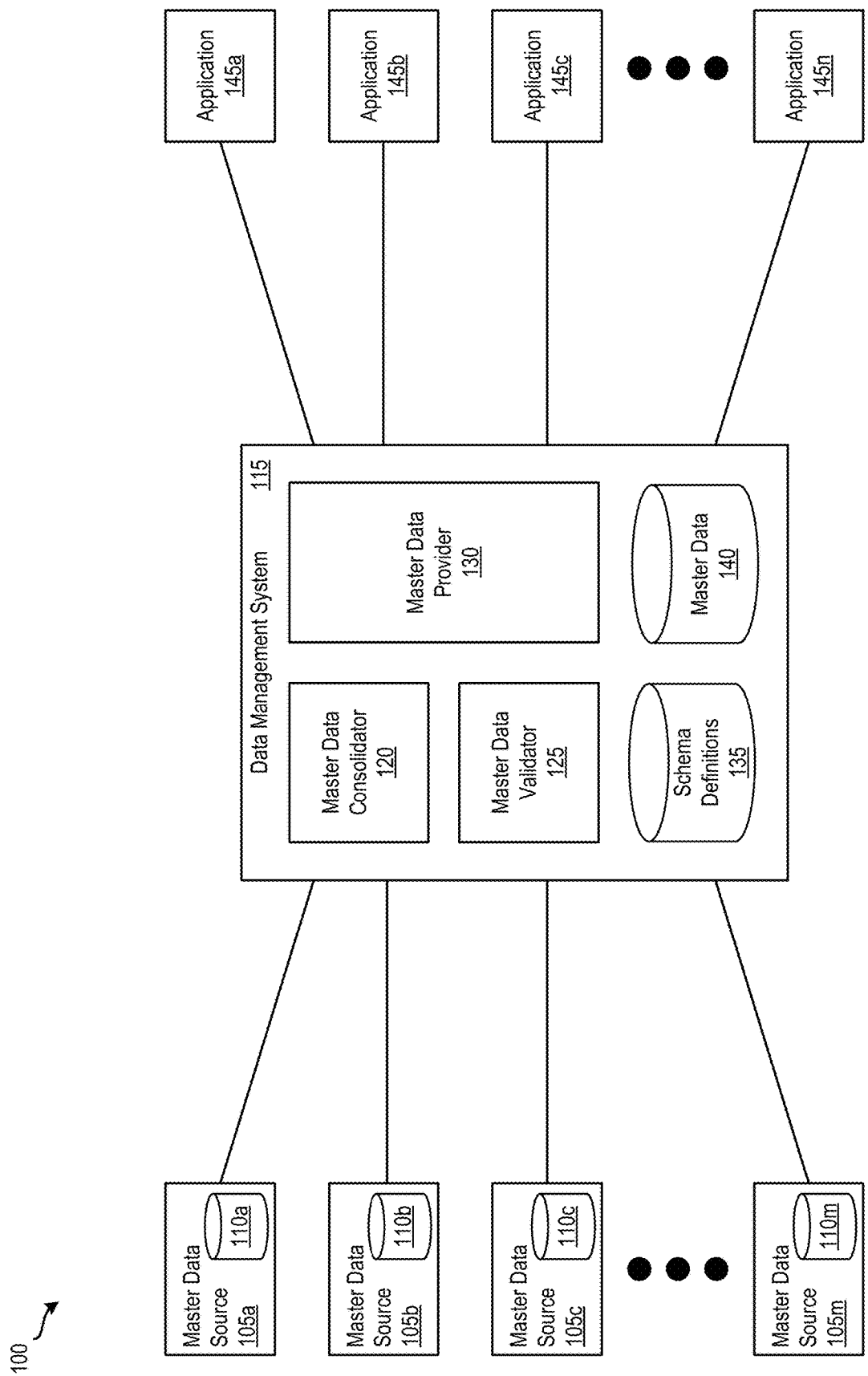
FIG. 1 illustrates a system for managing master data according to some embodiments.

FIG. 1 illustrates a system 100 for managing master data according to some embodiments. As shown, system 100 includes master data sources 105a-m, data management system 115, and applications 145a-n. Each of the master data sources 105a-m is configured to manage and store its own separate set of master data. Specifically, each of the master data sources 105a-m includes a corresponding master data storage 110 that is configured to store the set of master data that the master data source 105 manages Each master data source 105 may add new master data (e.g., entities) to its master data storage 110, update existing master data stored in its master data storage 110, and delete master data from its master data storage 110. In some embodiments, each master data source 105 can keep track of operations to master data (e.g., adding data, updating data, deleting data, etc.) in its master data storage 110 using a time-based index (e.g., an index of timestamps indicating the time at which each operation was performed on a particular master data).

Each of the master data sources 105a-m may handle requests for master data. For example, a master data source 105 can receive from data management system 115 a request for master data and a time value (e.g., a timestamp). In response to the request, the master data source 105 uses its time-based index to retrieve a set of master data (e.g., master data entities). For instance, the master data source 105 may retrieve each master data entity associated with a time value in the time-based index that is equal to or greater than the time value received from data management system 115 (e.g., master data that has been operated on at the time of, or later than, the time value). In response to the request, the master data source 105 sends the retrieved master data entities to data management system 115.

As illustrated, data management system 115 includes master data consolidator 120, master data validator 125, master data provider 130, schema definitions storage 135, and master data storage 140. Schema definitions storage 135 stores schema definitions for master data. In some embodiments, a schema definition for master data specifies a set of entities and a set of relationships among the set of entities. Each entity in the set of entities can specify a unique identifier and a set of attributes.

Figure 2:
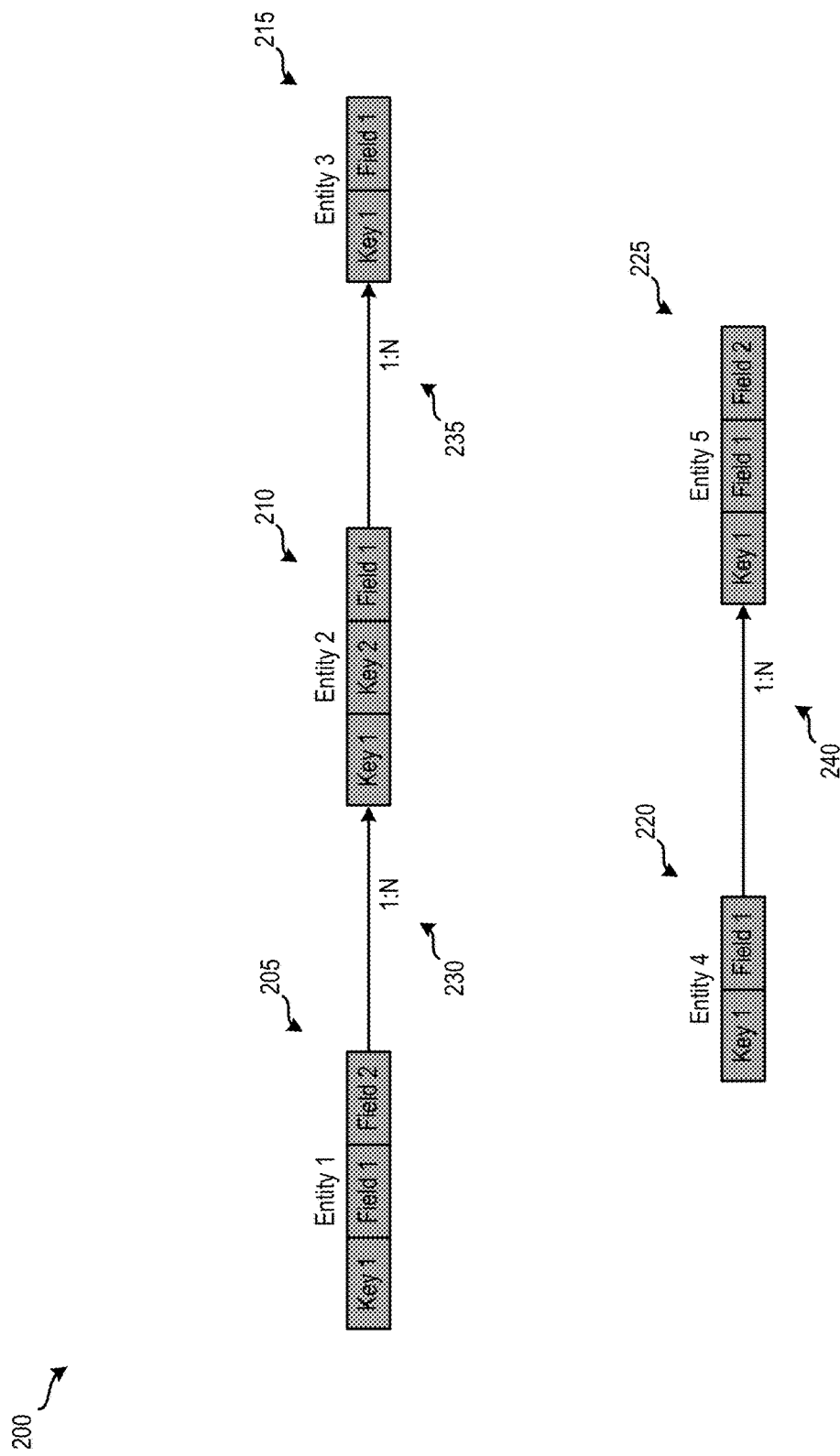
FIG. 2 illustrates an example schema definition according to some embodiments.

FIG. 2 illustrates an example schema definition 200 according to some embodiments. In some embodiments, schema definition 200 defines the master data entities of the master data managed by master data sources 105a-m and the relationships among those master data entities.

As shown, schema definition 200 includes entity definitions 205-225 and relationship definitions 230-240. Entity definition 205 defines a first entity ("Entity 1") that includes a unique identifier attribute ("Key 1") and two field attributes ("Field 1" and "Field 2"). Entity definition 210 defines a second entity ("Entity 2") that includes two unique identifier attributes ("Key 1" and "Key 2") and a field attribute ("Field 1"). Entity definition 215 defines a third entity ("Entity 3") that includes a unique identifier attribute ("Key 1") and a field attribute ("Field 1"). In this example, Key 1 of Entity 1 and Key 1 of Entity 2 are used to relate instance of each entity to each other. That is, a first instance of Entity 1 and a second instance of Entity 2 that have matching Key 1 values are related to each other. Similarly, Key 2 of Entity 2 and Key 1 of Entity 3 are used to relate instance of each entity to each other. As such, a first instance of Entity 2 with a Key 2 value that matches a Key 1 value of a second instance of Entity 3 are related to each other. Entity definition 220 defines a fourth entity ("Entity 4") that includes a unique identifier attribute ("Key 1") and a field attribute ("Field 1"). Entity definition 225 defines a fifth entity ("Entity 5") that includes a unique identifier attribute ("Key 1") and a two field attributes ("Field 1" and "Field 2"). Relationship definition 230 defines a one to N relationship between Entity 1 and Entity 2, relationship definition 235 defines a one to N relationship between Entity 2 and Entity 3, and relationship definition 240 defines a one to N relationship between Entity 4 and Entity 5. For this example, Entity 2 is a child of Entity 1 and Entity 3 is a child of Entity 2. Therefore, Entities 2 and 3 are descendants of Entity 1. Additionally, Entity 5 is a child of Entity 4.

Returning to FIG. 1, master data storage 140 is configured to store master data (e.g., master data entities) organized according to schema definitions stored in schema definitions storage 135. In some embodiments, schema definitions storage 135 and master data storage 140 are implemented in a single physical storage while, in other embodiments, schema definitions storage 135 and master data storage 140 may be implemented across several physical storages. While FIG. 1 shows schema definitions storage 135 and master data storage 140 as part of data management system 115, one of ordinary skill in the art will appreciate that schema definitions storage 135 and/or master data storage 140 may be external to data management system 115 in some embodiments Master data consolidator 120 is responsible for consolidating master data from master data sources 105a-m. For example, at defined intervals (e.g., once a minute, once every five minutes, once every fifteen minutes, once an hour, etc.), master data consolidator 120 sends each master data source 105 a request for master data and a time value of the current time. In response, master data consolidator 120 receives from each master data source 105 a set of master data entities that have time values equal to or greater than the time value sent to the master data source 105. Effectively, master data consolidator 120 is querying each master data source 105 for the most recently operated on master data entities. In some embodiments, master data consolidator 120 sends the requests to master data sources managing dependent entities (e.g., child and/or descendant entities) before sending requests to master data sources managing independent master data entities (e.g., parent and/or ancestor entities). Referring to FIG. 2 as an example, master data consolidator 120 would send a first request for the most recent master data entities to the master data source 105 managing instances of Entity 3, send a second request for the most recent master data entities to the master data source 105 managing instances of Entity 2, and then send a third request for the most recent master data entities to the master data source 105 managing instances of Entity 1. Similarly, master data consolidator 120 would send a fourth request for the most recent master data entities to the master data source 105 managing instances of Entity 5 and then send a fifth request for the most recent master data entities to the master data source 105 managing instances of Entity 4. Once master data consolidator 120 retrieves the most recent master data entities from master data sources 105a-m, master data consolidator 120 marks them as new master data and stores them in master data storage 140 organized according to the schema definition associated with the master data. Next, master data consolidator 120 sends master data validator 125 a message indicating that new master data has been stored in master data storage 140.

Master data validator 125 is configured to validate new master data stored in master data storage 140. For instance, when master data validator 125 receives a message from master data consolidator 120 indicating that new master data has been stored in master data storage 140, master data validator 125 accesses master data storage 140 and iterates through each master data entity marked as a new master data entity, determines whether the master data entity is consistent or inconsistent based on the schema definition associated with the master data entity, and marks the master data entity accordingly (e.g., consistent or inconsistent). In some embodiments, master data validator 125 determines whether a master data entity is consistent or inconsistent by determining whether the master data entity has any ancestor entities related to it based on the schema definition associated with the master data entity. If master data validator 125 determines that the master data entity does not have any ancestor entities related to it, master data validator 125 determines that the master data entity is consistent. If master data validator 125 determines that the master data entity does have any ancestor entities related to it, master data validator 125 determines whether the ancestor entities exist in master data storage 140. If so, master data validator 125 determines that that the master data entity is consistent. Otherwise, master data validator 125 determines that the master data entity is inconsistent.

After determining whether the new master data entities are inconsistent/consistent, master data validator 125 checks whether existing master data entities marked as inconsistent are now consistent based on the new master data entities. To do so, master data validator 125 iterates through each of these inconsistent master data entities and checks whether the ancestor entities are now stored in master data storage 140. If so, master data validator 140 marks the master data entity as consistent. Otherwise, master data validator 140 leaves the master data entity marked as inconsistent.

Master data provider 130 handles the provisioning of master data to applications 145a-n. For example, master data provider 130 can receive from an application 145 a request for a set of master data entities. In response to the request, master data provider 130 accesses master data storage 140 and retrieves master data entities in the requested set of master data entities that are marked as consistent. Master data provider 130 sends this subset of the requested set of master data entities to the application 145.

Each of the applications 145a-n is a software application configured to use master data stored in master data storage 140. For example, an application 145 may send data management system 115 a request for a set of master data entities. In return, the application 145 can receive the set of master data entities to use. In some embodiments, each application 145 is implemented in a separate computing device. In other embodiments, applications 145a-n may be implemented across any number of computing devices. For instance, application 145a can be implemented on a first computing device, applications 145b and 145c can be implemented on a second computing device, and applications 145d-n can be implemented on a third computing device.

Figure 3A:
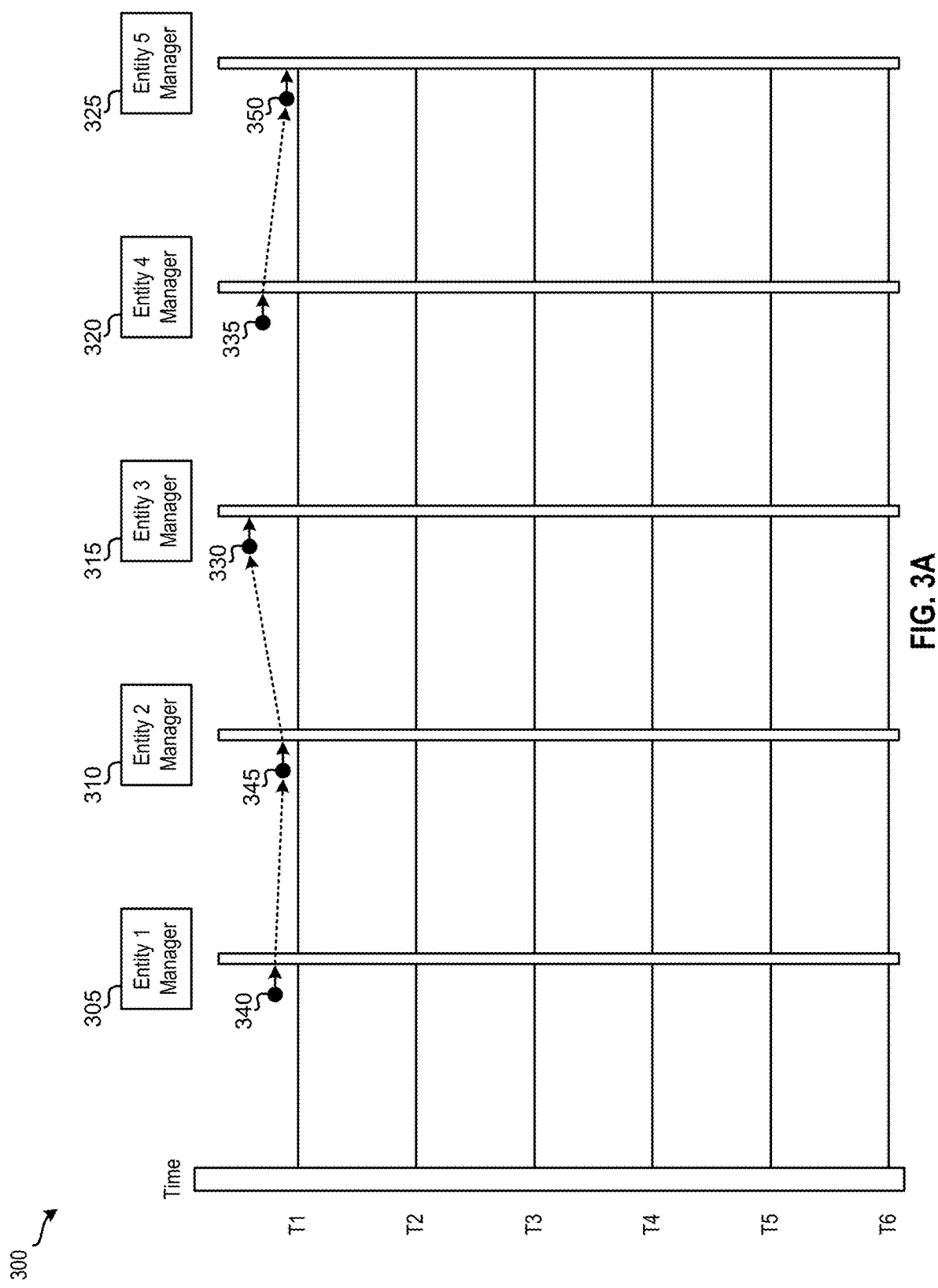
FIGS. 3A-3F illustrate an example timeline of different master data received from different master data sources according to some embodiments.

An example operation will now be described by reference to FIGS. 3A-3F according to some embodiments. In particular, this example operation shows what master data that data management system 115 can provide to applications 145a-n at various points in time. FIGS. 3A-3F illustrate an example timeline 300 of different master data received from different master data sources according to some embodiments. Referring to FIG. 3A, timeline 300 includes entity managers 305-325. In this example, each of the entity managers 305-325 is configured to manage instances of a particular entity defined in schema definition 200. Here, entity manager 305 manages instances of Entity 1, entity manager 310 manages instances of Entity 2, entity manager 315 manages instances of Entity 3, entity manager 320 manages instances of Entity 4, and entity manager 325 manages instances of Entity 5. Each of the entity managers 305-320 may be implemented by the same and/or different master data sources 105a-M.

The example begins by data management system 115 sending each of the entity managers 305-325 a request for instances of entities that the entity manager is managing. As shown in FIG. 3A, at various times before time T1, each of the entity managers 305-325 sends the requested instances to data management system 115. Specifically, data management system 115 receives an entity instance 330 of Entity 3 from entity manage 315, an entity instance 335 of Entity 4 from entity manage 320, an entity instance 340 of Entity 1 from entity manage 305, an entity instance 345 of Entity 2 from entity manage 310, and an entity instance 350 of Entity 5 from entity manage 325. Upon receiving entity instances 330-350 from entity managers 305-325, data management system determines whether each of the entity instances 330-350 is consistent or inconsistent using the techniques explained above. In this example, data management system 115 determines that each of the entity instances 330-350 is consistent. Therefore, at time T1, data management system 115 can provide any of the entity instances 330-350 to applications 145a-n.

Figure 3B:
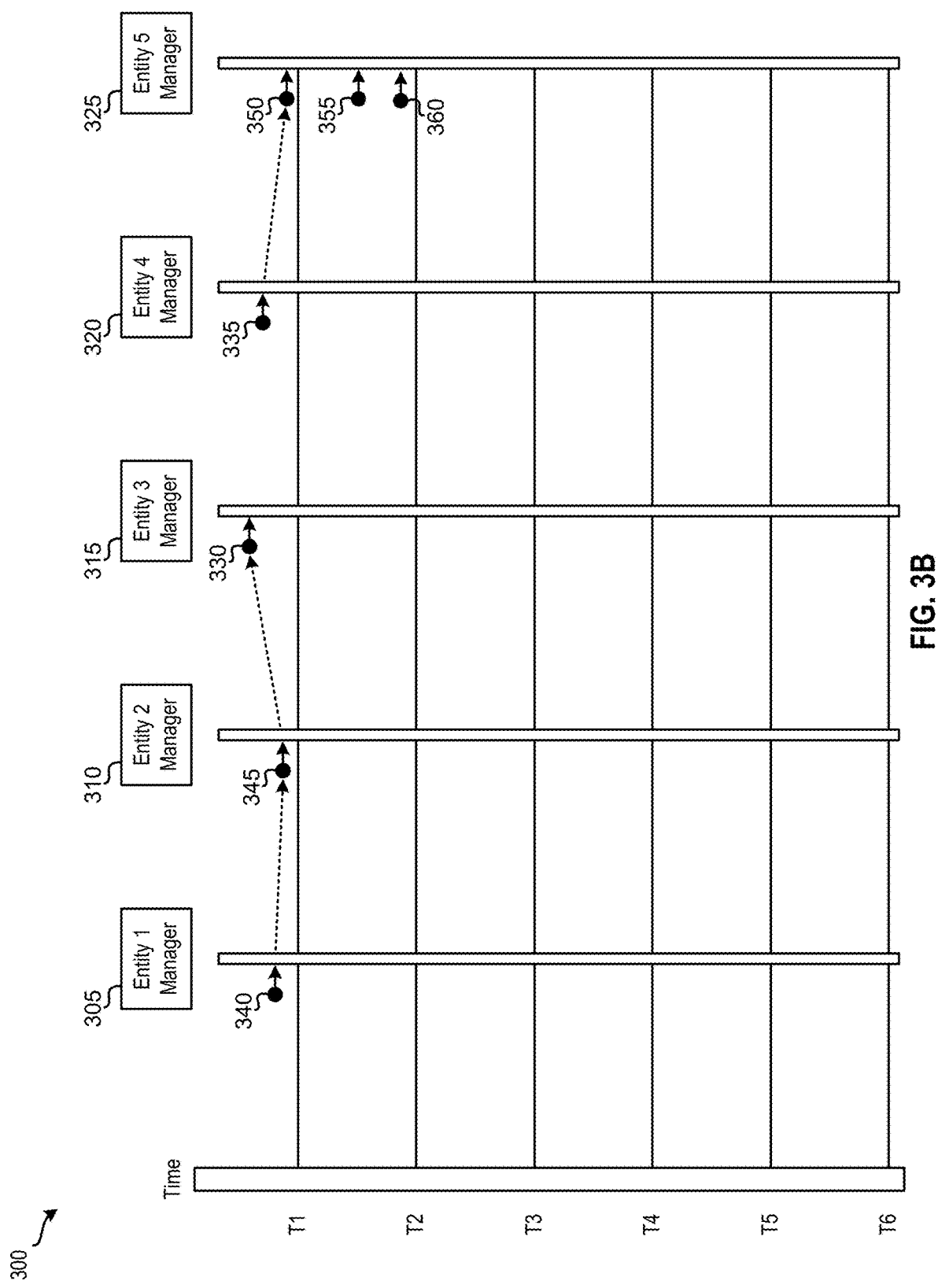

At time T1, data management system 115 sends each of the entity managers 305-325 a request for recent instances of entities that the entity manager is managing and a time value of the time of the last request. FIG. 3B illustrates the entity instances that data management system 115 receives from entity manages 305-325 in response to these requests. Here, only entity manager 325 had any recent entity instances. As depicted in FIG. 3B, data management system 115 receives entity instances 355 and 360 of Entity 5 from entity manager 325. In addition, data management system 115 receives from entity managers 305-320 responses indicating that they did not have any recent entity instances since the time of the last request. Once data management system 115 receives responses from each of the entity managers 305-325, data management system 115 determines whether each of the entity instances 355 and 360 is consistent or inconsistent. For this example, data management system 115 determines that entity instances 355 and 360 are inconsistent because each of them is missing its parent entity (i.e., an instance of Entity 4, as specified in schema definition 200). Thus, at time T2, data management system 115 can only provide any of the entity instances 330-350 to applications 145a-n.

Figure 3C:
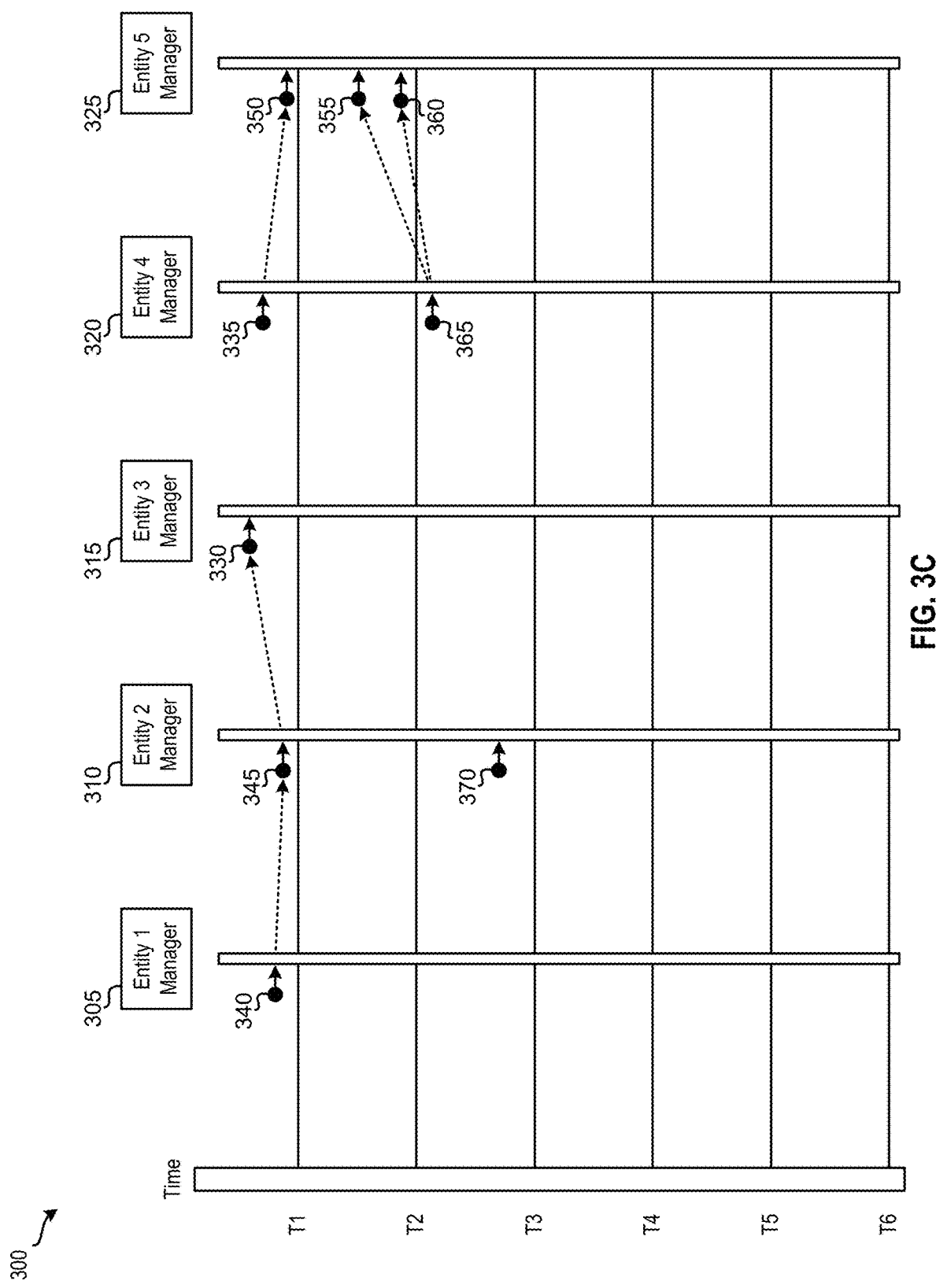

Continuing with the example, at time T2, data management system 115 sends each of the entity managers 305-325 a request for recent instances of entities that the entity manager is managing and a time value of the time of the last request. FIG. 3C illustrates the entity instances that data management system 115 receives from entity manages 305-325 in response to such requests. In this example, only entity managers 310 and 320 had any recent entity instances. As illustrated in FIG. 3C, data management system 115 receives entity instance 365 of Entity 4 from entity manager 320 and entity instance 370 of Entity 2 from entity manager 310. Data management system 115 also receives from entity managers 305, 315, and 315 responses indicating that they did not have any recent entity instances since the time of the last request. After data management system 115 receives responses from each of the entity managers 305-325, data management system 115 determines whether each of the entity instances 365 and 370 is consistent or inconsistent. Here, data management system 115 determines that entity instance 370 is inconsistent because it is missing its parent entity (i.e., an instance of Entity 1, as specified in schema definition 200). Data management system 115 determines that entity instance 365 is consistent since it does not have a parent entity relationship according to schema definition 200. Next, data management system 115 checks whether entity instances 355 and 360, which were previously marked as inconsistent, are now consistent. For this example, data management system 115 determines that entity instances 355 and 360 are now consistent as they each now have a parent entity (entity instance 365). As such, at time T3, data management system 115 can only provide any of the entity instances 330-365 to applications 145a-n.

Figure 3D:
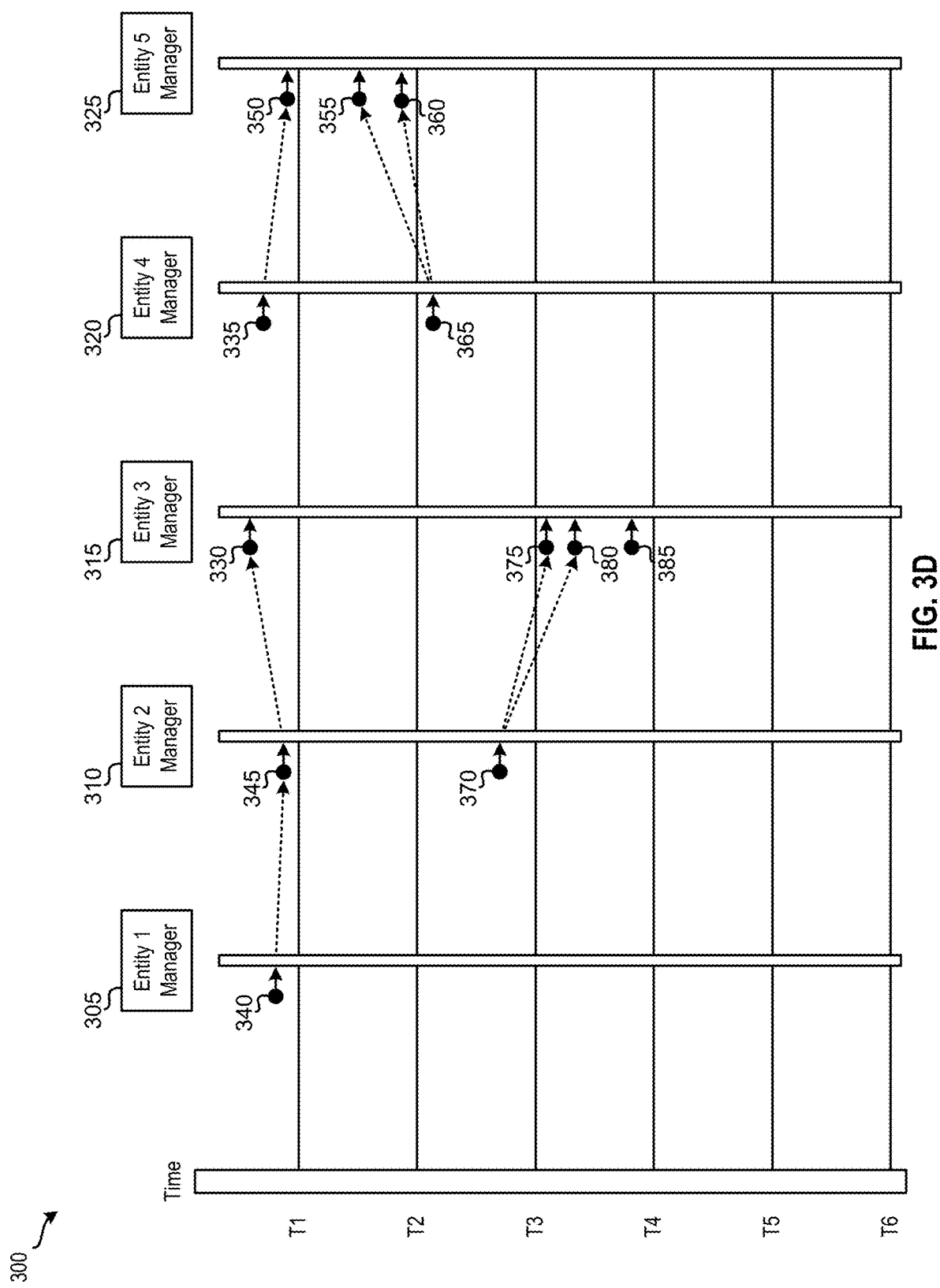

At time T3, data management system 115 sends each of the entity managers 305-325 a request for recent instances of entities that the entity manager is managing and a time value of the time of the last request. FIG. 3D illustrates the entity instances that data management system 115 receives from entity manages 305-325 in response to the requests. For this example, only entity manager 315 had any recent entity instances. As depicted in FIG. 3D, data management system 115 receives entity instances 375-385 of Entity 3 from entity manager 315. Additionally, data management system 115 receives from entity managers 305, 310, 320, and 325 responses indicating that they did not have any recent entity instances since the time of the last request. Upon receiving responses from each of the entity managers 305-325, data management system 115 determines whether each of the entity instances 375-385 is consistent or inconsistent. In this example, data management system 115 determines that each of the entity instances 375 and 380 is inconsistent. Although entity instances 375 and 380 has a parent entity (entity instance 370), they are missing their grandparent entity (i.e., entity instance 370 is missing its parent entity) based on schema definition 200. Then, data management system 115 determines that entity instance 385 is inconsistent as it does not have a parent entity (an entity instance of Entity 1). Next, data management system 115 checks whether entity instances 370 and 360, which was previously marked as inconsistent, is now consistent. Here, data management system 115 determines that entity instance 370 is still inconsistent because it is still missing its parent entity (an entity instance of Entity 1). Hence, at time T4, data management system 115 can only provide any of the entity instances 330-365 to applications 145a-n.

Figure 3E:
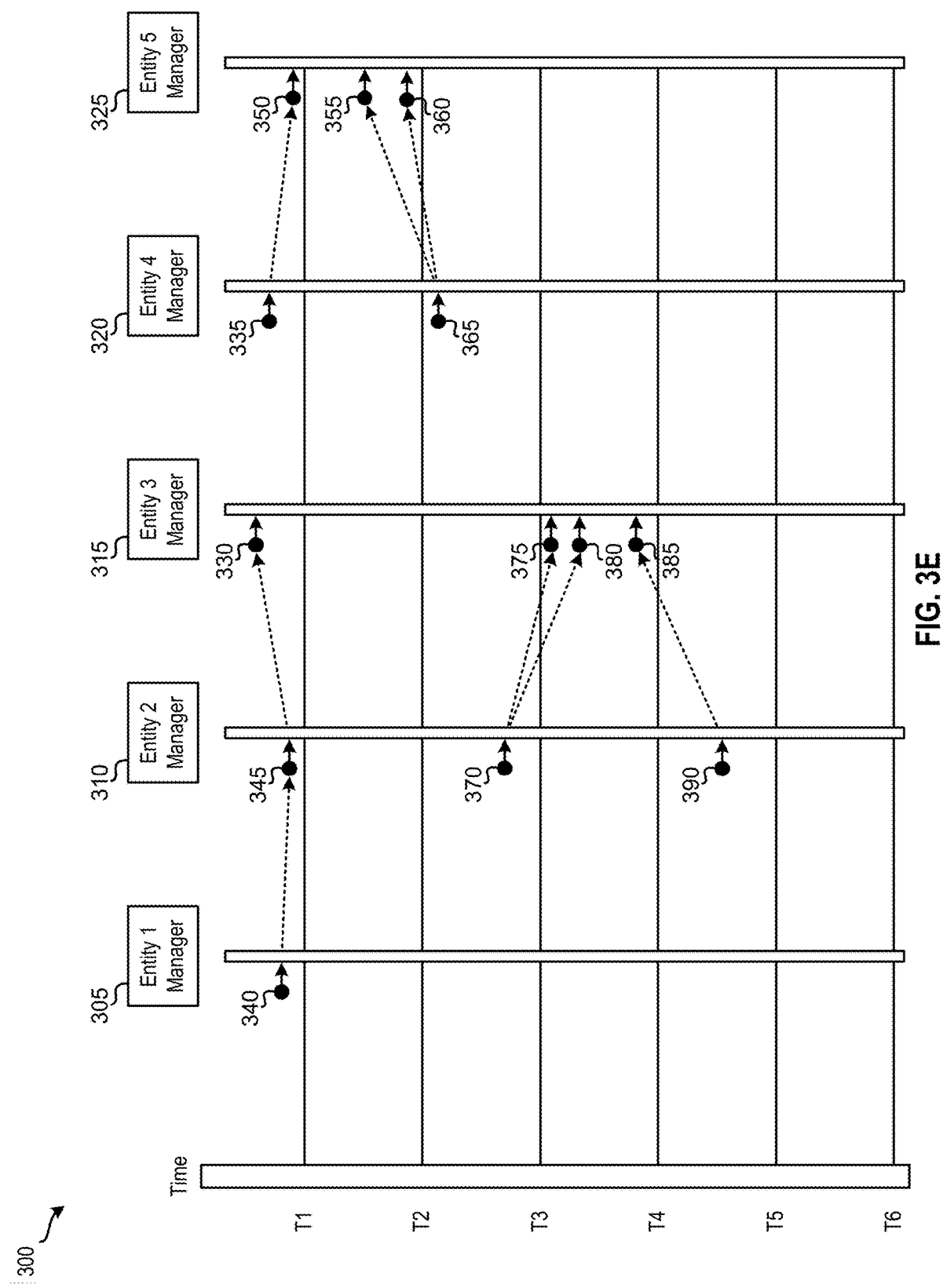

Continuing with the example, at time T4, data management system 115 sends each of the entity managers 305-325 a request for recent instances of entities that the entity manager is managing and a time value of the time of the last request. FIG. 3E illustrates the entity instances that data management system 115 receives from entity manages 305-325 in response to the requests. In this example, only entity manager 310 had any recent entity instances. As shown in FIG. 3E, data management system 115 receives entity instance 390 of Entity 2 from entity manager 310. Data management system 115 also receives from entity managers 305 and 315-325 responses indicating that they did not have any recent entity instances since the time of the last request. When data management system 115 receives responses from each of the entity managers 305-325, data management system 115 determines whether entity instance 390 is consistent or inconsistent. For this example, data management system 115 determines that entity instance 390 is inconsistent because it is missing its parent entity (i.e., an instance of Entity 1). Next, data management system 115 checks whether entity instances 370-385, which were previously marked as inconsistent, are now consistent. Here, data management system 115 determines that entity instances 370-385 are still inconsistent since entity instance 370 is missing its parent entity, entity instances 375 and 380 are missing their grandparent entity, and entity instance 385 is missing its parent entity. Therefore, at time T5, data management system 115 can only provide any of the entity instances 330-365 to applications 145a-n.

Figure 3F:
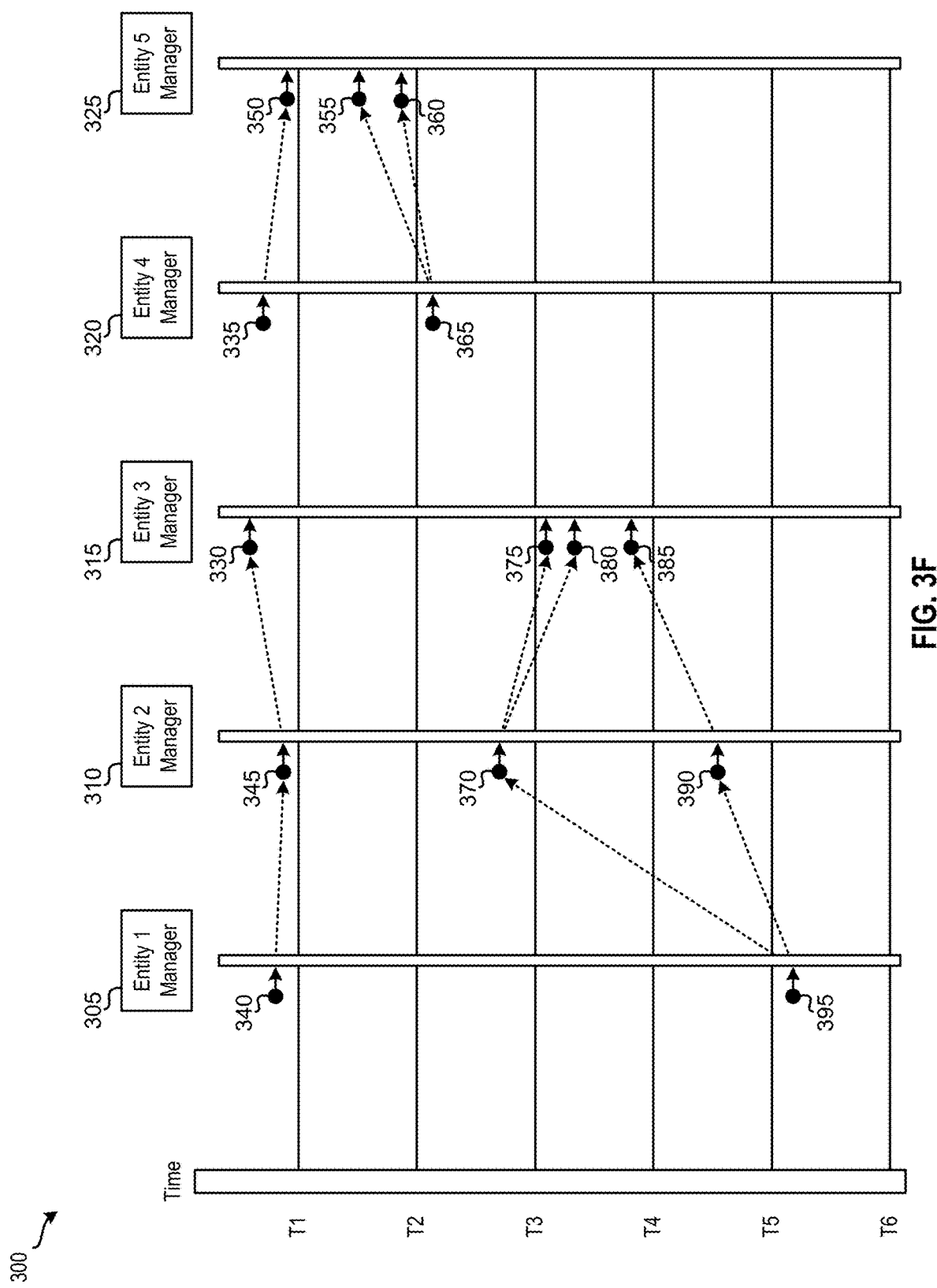

Finally, at time T5, data management system 115 sends each of the entity managers 305-325 a request for recent instances of entities that the entity manager is managing and a time value of the time of the last request. FIG. 3F illustrates the entity instances that data management system 115 receives from entity manages 305-325 in response to such requests. Here, only entity manager 305 had any recent entity instances. As depicted in FIG. 3F, data management system 115 receives entity instance 395 of Entity 1 from entity manager 305. In addition, data management system 115 receives from entity managers 310-325 responses indicating that they did not have any recent entity instances since the time of the last request. After data management system 115 receives responses from each of the entity managers 305-325, data management system 115 determines whether entity instance 390 is consistent or inconsistent. In this example, data management system 115 determines that entity instance 390 is consistent as it does not have a parent entity relationship based on schema definition 200.

Then, data management system 115 checks whether entity instances 370-390, which were previously marked as inconsistent, are now consistent. For this example, data management system 115 determines that entity instances 370-390 are now consistent because entity instances 370 and 390 have a parent entity and entity instances 375-385 have their grandparent entities. Thus, at time T6, data management system 115 can provide any of the entity instances 330-395 to applications 145a-n.

Figure 4:
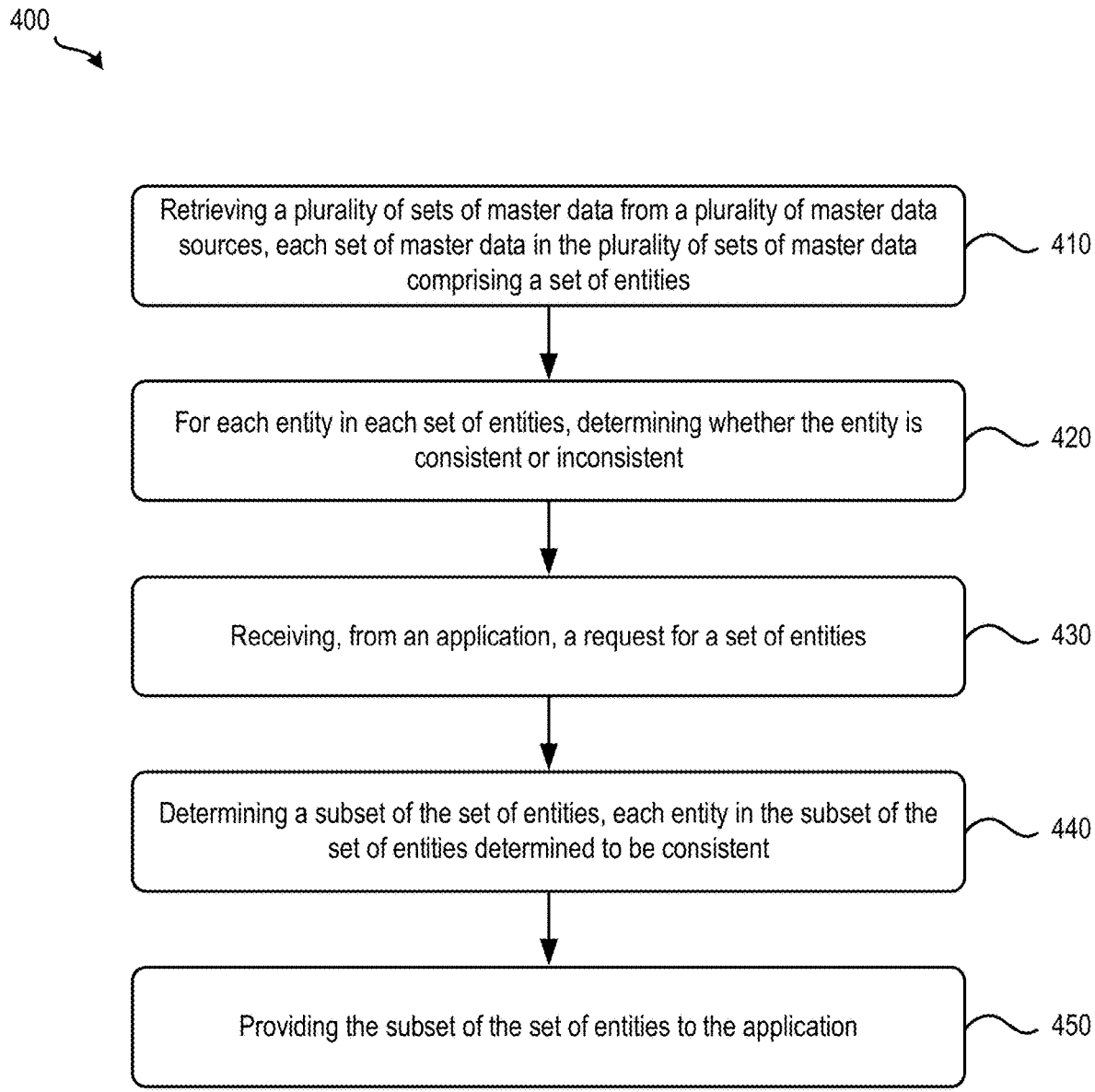
FIG. 4 illustrates a process for managing master data according to some embodiments.

FIG. 4 illustrates a process 400 for managing master data according to some embodiments. In some embodiments, data management system 115 performs process 400. Process 400 starts by, at 410, retrieving a plurality of sets of master data from a plurality of master data sources. Each set of master data in the plurality of sets of master data comprises a set of entities. Referring to FIG. 1, data consolidator 120 may, retrieve several sets of master data entities from master data sources 105a-m.

Next, for each entity in each set of entities, process 400 determines, at 420, whether the entity is consistent or inconsistent. Referring to FIGS. 1 and 3A as an example, master data validator 125 can determine, at time T1, whether each of the entity instances 330-350 is consistent or inconsistent. Process 400 then receives, at 430, from an application, a request for a set of entities. Referring to FIGS. 1 and 3B as an example, master data provider 130 can receive, from an application 145, a request for a set of entity instances from entity managers 320 and 325.

At 440, process 400 determines a subset of the set of entities, each entity in the subset of the set of entities determined to be consistent. Referring to FIGS. 1 and 3B as an example, master data provider 130 determines the subset of entity instances 335 and 350-360 to include only entity instances 335 and 350 because entity instances 355 and 360 have been marked as inconsistent. Finally, process 400 provides, at 450, the subset of the set of entities to the application. Referring to FIGS. 1 and 3B as an example, master data provider 130 provides entity instances 355 and 360.

Figure 5:
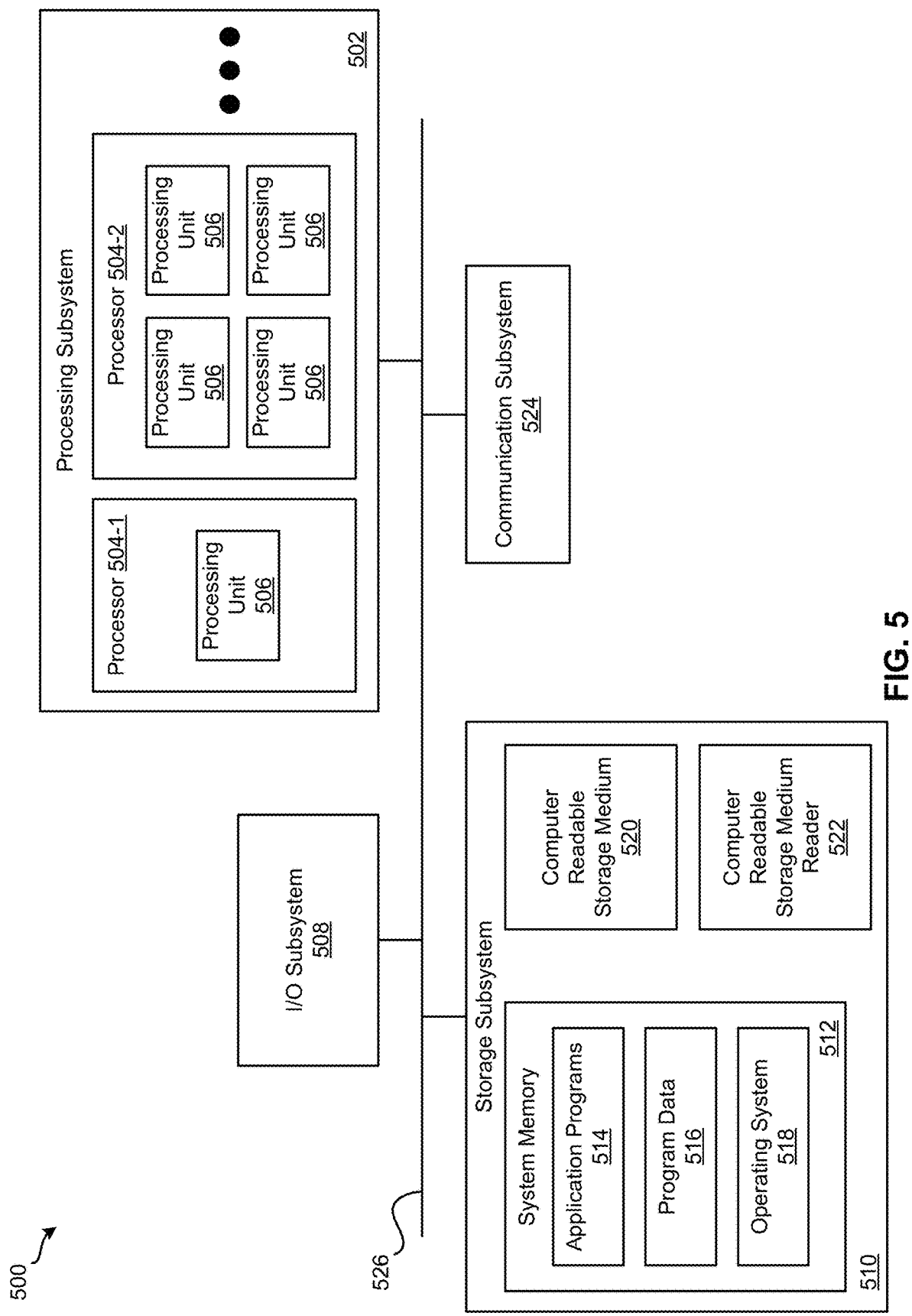
FIG. 5 illustrates an exemplary computer system, in which various embodiments may be implemented.

FIG. 5 illustrates an exemplary computer system 500 for implementing various embodiments described above. For example, computer system 500 may be used to implement master data sources 105a-m, data management system 110, and applications 140a-n. Computer system 500 may be a desktop computer, a laptop, a server computer, or any other type of computer system or combination thereof. Some or all elements of master data consolidator 120, master data validator 125, master data provider 130, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522.

System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514, program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., master data consolidator 120, master data validator 125, and master data provider 130) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
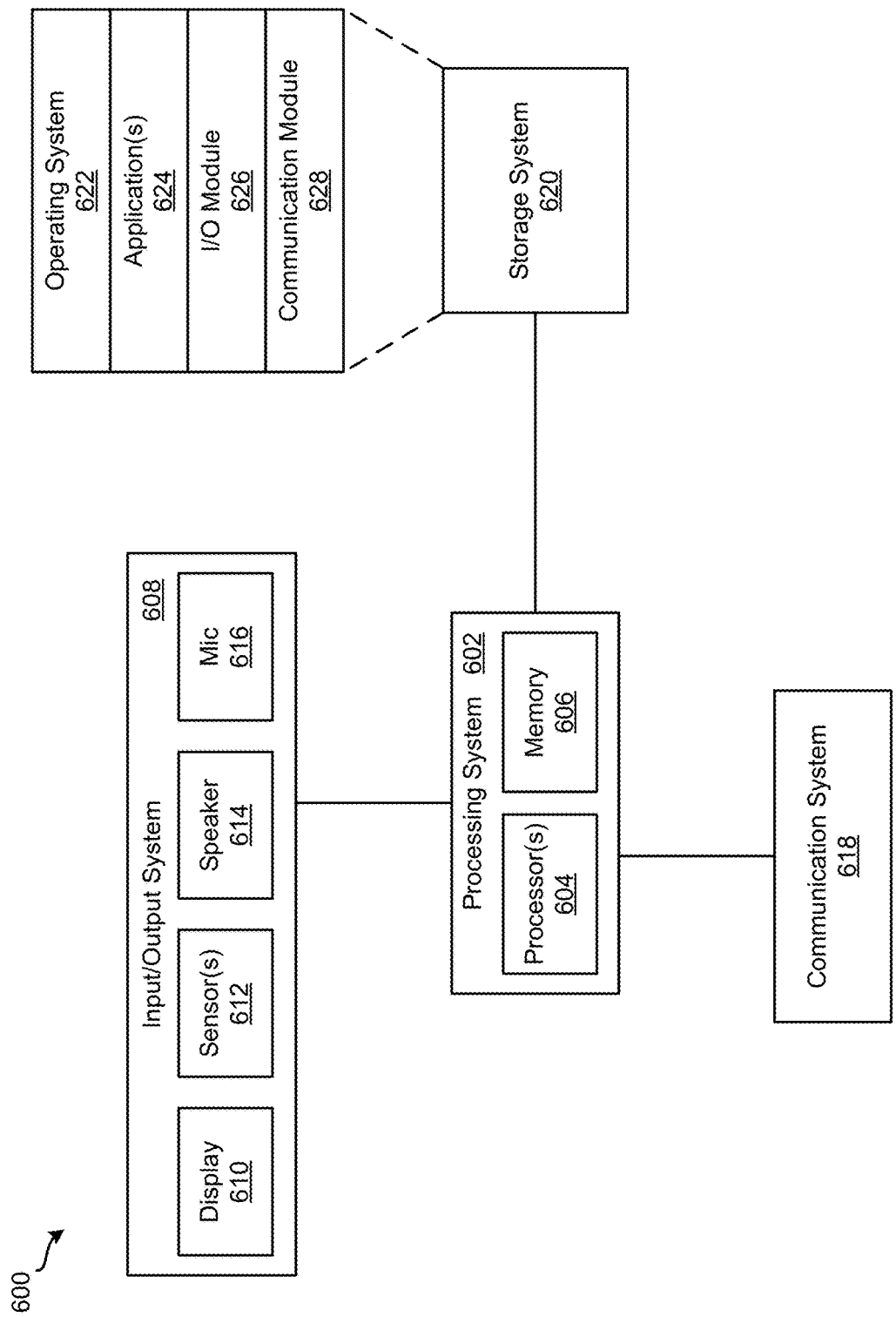
FIG. 6 illustrates an exemplary computing device, in which various embodiments may be implemented.

FIG. 6 illustrates an exemplary computing device 600 for implementing various embodiments described above. For example, computing device 600 may be used to implement master data sources 105*a-m* and applications 145*a-n*. Computing device 600 may be a cellphone, a smartphone, a wearable device, an activity tracker or manager, a tablet, a personal digital assistant (PDA), a media player, or any other type of mobile computing device or combination thereof. As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606. Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrate into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI) generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input. One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
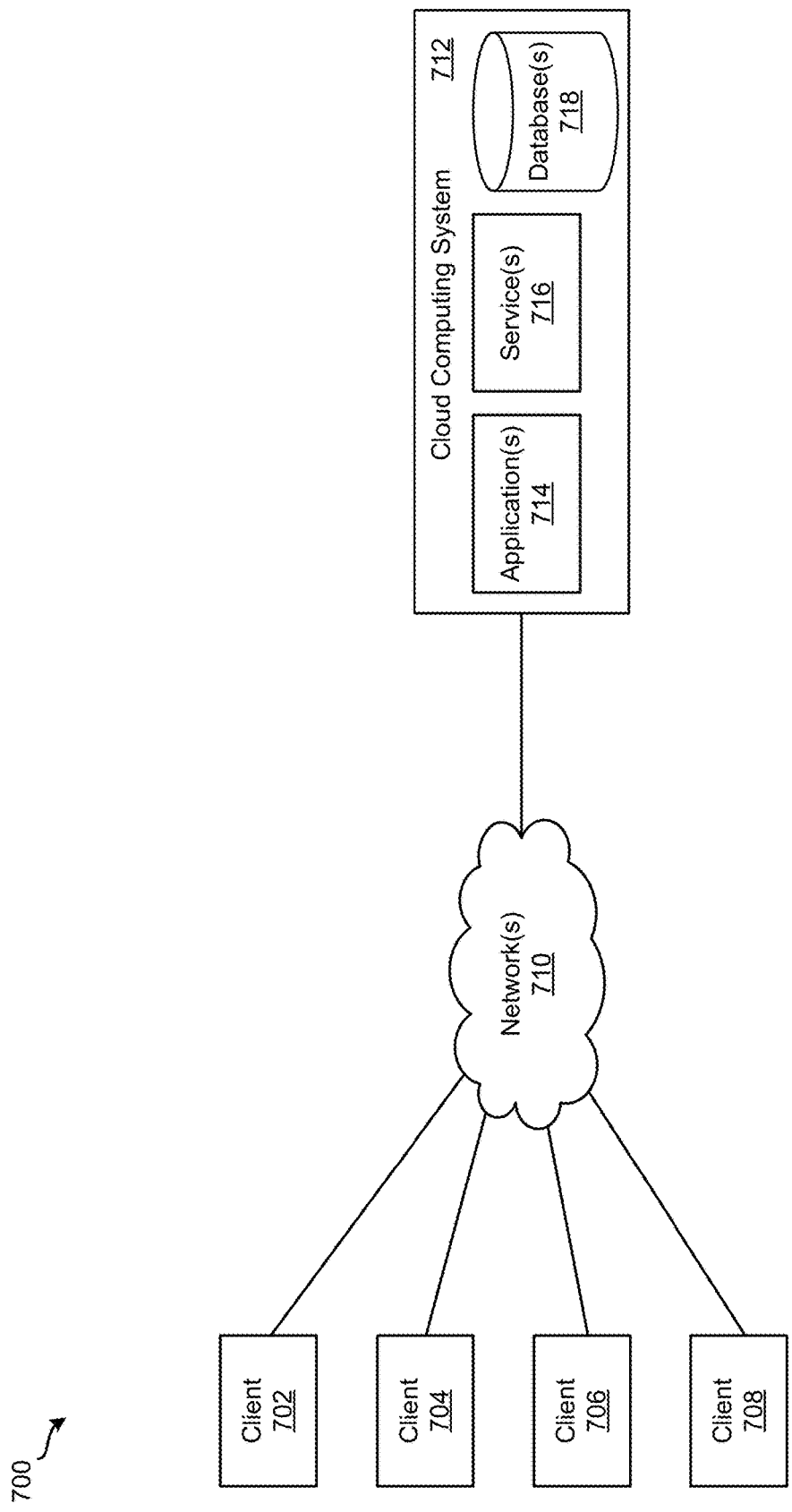
FIG. 7 illustrates an exemplary system, in which various embodiments may be implemented.

FIG. 7 illustrates an exemplary system 700 for implementing various embodiments described above. For example, client devices 702-708 may be used to implement master data sources 105a-m and/or applications 140a-n. Cloud computing system may be used to implement data management system 110. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 712 is referred to as a "cloud service." Typically, servers and systems that make up cloud computing system 712 are different from the on-premises servers and systems of a customer. For example, cloud computing system 712 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, schema definitions storage 135 and master data storage 140 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:

querying a plurality of master data sources to retrieve a plurality of sets of master data from the plurality of master data sources, each set of master data in the plurality of sets of master data comprising a set of master data entities, wherein the plurality of master data sources independently manage master data entities, wherein a schema definition specifies at least one master data entity from at least one master data source has an ancestor relationship to at least one other master data entity from at least one other master data source, and wherein said querying is performed at defined time intervals to retrieve most recently operated on master data entities, based on a time of a last request, from each of the plurality of master data sources, wherein the master data sources having ancestor master data entities are queried before master data sources having independent master data entities that are not ancestors of any master data entities;

for each master data entity in each set of master data entities, determining whether a master data entity is consistent or inconsistent based on a schema definition associated with the plurality of sets of master data, wherein:

upon determining that the master data entity does not have any ancestor master data entities related to the master data entity or upon determining that the master data entity does have any ancestor master data entities related to the master data entity and that the ancestor master data entities exist in a storage configured to store master data received from the plurality of master data sources, determining that the master data entity is consistent; and upon determining that the master data entity from a first master data source does have any ancestor master data entities from one or more other master data sources related to the master data entity and that the ancestor entities do not exist in the storage, determining that the master data entity is inconsistent, wherein the schema definition further defines a particular set of master data entities and a set of relationships among the particular set of master data entities;

receiving, from an application, a request for a certain set of master data entities;

based on the plurality of sets of master data entities, determining a subset of the certain set of master data entities, each master data entity in the subset of the certain set of master data entities determined to be consistent; and providing the subset of the certain set of master data entities to the application.

2. The non-transitory machine-readable medium of claim 1, wherein retrieving the plurality of sets of master data from the plurality of master data sources comprises retrieving dependent master data entities first.

3. The non-transitory machine-readable medium of claim 2, wherein retrieving dependent entities first comprises:
determining a first set of master data entities;
determining a second set of master data entities, wherein each master data entity in the second set of master data entities is dependent on a master data entity in the first set of master data entities;
retrieving the second set of master data entities; and
after retrieving the second set of master data entities, retrieving the first set of master data entities.

4. The non-transitory machine-readable medium of claim 1, wherein the program further comprises a set of instructions for, for each master data entity in each set of master data entities determined to be inconsistent, marking the master data entity as being inconsistent.

5. The non-transitory machine-readable medium of claim 1, wherein the program further comprises sets of instructions for:
identifying any master data entities previously marked as inconsistent; and
determining whether such master data entities are now consistent based on the plurality of sets of master data.

6. The non-transitory machine-readable medium of claim 1, wherein retrieving the plurality of sets of master data comprises sending each master data source in the plurality of master data sources a request for master data and a time value indicating a time of a previous request.

7. The non-transitory machine-readable medium of claim 1, wherein each master data source in the plurality of master data sources is configured to manage a particular set of master data entities.

8. A method comprising:
querying a plurality of master data sources to retrieve a plurality of sets of master data from the plurality of master data sources, each set of master data in the plurality of sets of master data comprising a set of master data entities, wherein the plurality of master data sources independently manage master data entities, wherein a schema definition specifies at least one master data entity from at least one master data source has an ancestor relationship to at least one other master data entity from at least one other master data source, and wherein said querying is performed at defined time intervals to retrieve most recently operated on master data entities, based on a time of a last request, from each of the plurality of master data sources, wherein the master data sources having ancestor master data entities are queried before master data sources having independent master data entities that are not ancestors of any master data entities;

for each master data entity in each set of master data entities,
determining whether a master data entity is consistent or inconsistent based on the schema definition associated with the plurality of sets of master data, and wherein:
upon determining that the master data entity does not have any ancestor master data entities related to the master data entity or upon determining that the master data entity does have any ancestor master data entities related to the master data entity and that the ancestor master data entities exist in a storage configured to store master data received from the plurality of master data sources, determining that the master data entity is consistent; and
upon determining that the master data entity from a first master data source does have any ancestor master data entities from one or more other master data sources related to the master data entity and that the ancestor master data entities do not exist in the storage, determining that the master data entity is inconsistent, wherein the schema definition further defines a particular set of master data entities and a set of relationships among the particular set of master data entities;

receiving, from an application, a request for a certain set of master data entities;

based on the plurality of sets of master data entities, determining a subset of the certain set of master data entities, each master data entity in the subset of the certain set of master data entities determined to be consistent; and providing the subset of the certain set of master data entities to the application.

9. The method of claim 8 further comprising, for each master data entity in each set of master data entities determined to be inconsistent, marking the master data entity as being inconsistent.

10. The method of claim 8 further comprising:
identifying any master data entities previously marked as inconsistent; and
determining whether such master data entities are now consistent based on the plurality of sets of master data.

11. The method of claim 8, wherein retrieving the plurality of sets of master data comprises sending each master data source in the plurality of master data sources a request for master data and a time value indicating a time of a previous request.

12. The method of claim 8, wherein each master data source in the plurality of master data sources is configured to manage a particular set of master data master data entities.

13. A system comprising:
a set of processing units; and
a non-transitory machine-readable medium storing instructions that when executed by at least one processing unit in the set of processing units cause the at least one processing unit to:
query a plurality of master data sources to retrieve a plurality of sets of master data from the plurality of master data sources, each set of master data in the plurality of sets of master data comprising a set of master data entities, wherein the plurality of master data sources independently manage master data entities, wherein a schema definition specifies at least one master data entity from at least one master data source has an ancestor relationship to at least one other master data entity from at least one other master data source, and wherein said querying is performed at defined time intervals to retrieve most recently operated on master data entities, based on a time of a last request, from each of the plurality of master data sources, wherein the master data sources having ancestor master data entities are queried before master data sources having independent master data entities that are not ancestors of any master data entities;

for each master data entity in each set of master data entities, determine whether a master data entity is consistent or inconsistent based on a schema definition associated with the plurality of sets of master data, wherein:

upon determining that the master data entity does not have any ancestor master data entities related to the master data entity or upon determining that the master data entity does have any ancestor master data entities related to the master data entity and that the ancestor master data entities exist in a storage configured to store master data received from the plurality of master data sources, determining that the master data entity is consistent; and upon determining that the master data entity from a first master data source does have any ancestor master data entities from one or more other master data sources related to the master data entity and that the ancestor entities do not exist in the storage, determining that the master data entity is inconsistent, wherein the schema definition further defines a particular set of master data entities and a set of relationships among the particular set of master data entities;

receive, from an application, a request for a certain set of master data entities;

based on the plurality of sets of master data entities, determine a subset of the certain set of master data entities, each master data entity in the subset of the certain set of master data entities determined to be consistent; and provide the subset of the certain set of master data entities to the application.

14. The system of claim 13, wherein retrieving the plurality of sets of master data from the plurality of master data sources comprises retrieving dependent master data entities first.

15. The system of claim 14, wherein retrieving dependent master data entities first comprises:

determining a first set of master data entities;

determining a second set of master data entities, wherein each master data entity in the second set of master data entities is dependent on a master data entity in the first set of master data entities;

retrieving the second set of master data entities; and after retrieving the second set of master data entities, retrieving the first set of master data entities.

16. The system of claim 13, wherein the instructions further cause the at least one processing unit to, for each master data entity in each set of master data entities determined to be inconsistent, mark the master data entity as being inconsistent.

17. The system of claim 13, wherein the instructions further cause the at least one processing unit to:

identify any master data entities previously marked as inconsistent; and determine whether such master data entities are now consistent based on the plurality of sets of master data.

18. The system of claim 13, wherein retrieving the plurality of sets of master data comprises sending each master data source in the plurality of master data sources a request for master data and a time value indicating a time of a previous request.

* * * * *